Sept. 21, 1937.  K. SCHWARZ  2,093,490
REPRODUCTION OF SOUND RECORDS
Filed July 2, 1935
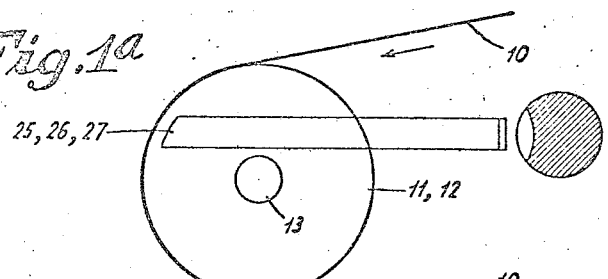
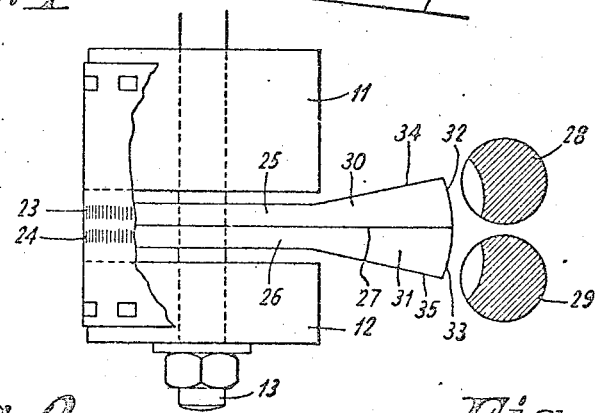
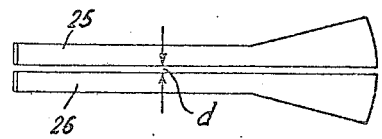
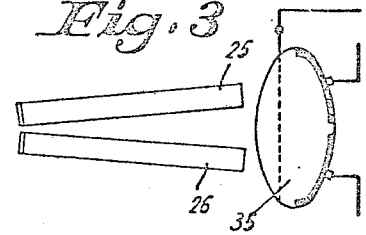
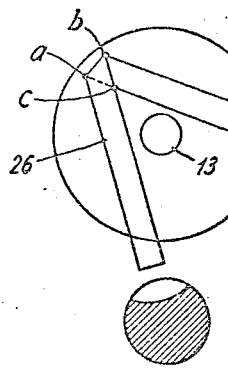
INVENTOR
KARL SCHWARZ
BY
ATTORNEY Patented Sept. 21, 1937

2,093,490

UNITED STATES PATENT OFFICE 2,093,490

REPRODUCTION OF SOUND RECORDS

Karl Schwarz, Berlin, Germany, assignor to Klangfilm G. m. b. H., Berlin, Germany, a corporation of Germany Application July 2, 1935, Serial No. 29,439
In Germany September 26, 1934

4 Claims. (Cl. 179—100.3)

This invention relates to the reproduction of sound records of the type whereon a negative and positive half-cycle of the sound wave are recorded in the form of sound tracks spaced from one another, and has for its principal object the provision of an improved arrangement for transmitting the sound track modulated light to the photo-electric or light sensitive elements by which the modulated light is converted into corresponding audiofrequency currents.

There has been provided in the past an arrangement which serves the purpose of diascopically scanning a band-shaped sound track or record, preferably a film strip photo-electrically, and in which between two drum halves supporting a sound track there is provided a straight glass rod designed to deflect the light transmitted through the sound track to a photo-electric cell.

The present invention is concerned with an improved arrangement of such means to reproduce sound records in which the positive and the negative half-cycles are recorded in the form of separate tracks.

The embodiments of the invention described in what follows are schematically illustrated in the drawing. What is common to all embodiments is the fact that for each of the two separate sound tracks a rod of quartz, glass or the like is provided.

The invention will be better understood from the following description when considered in connection with the accompanying drawing, and its scope will be pointed out in the appended claims.

Referring to the drawing,

Figures 1 and 1a are diagrammatic showings of side and plan views of a sound reproducer constructed in accordance with the invention, and Figs. 2, 3 and 4 illustrate different modifications of the light transmitting means interposed between the sound record and the photo-electric cell or cells.

Referring to Fig. 1, 10 denotes a sound film strip which is moved by means of a sprocket (not shown) over a drum consisting of two parts 11 and 12 and fixedly mounted upon a common spindle 13. This drum which is set in rotation by the said film strip may be rigidly coupled with a flywheel mass or other suitable speed stabilizer. The divided or bipartite sound track 23, 24 which is here shown to be of the variable density type although it could just as well consist of the variable area kind, is illuminated in a manner customary in reproducer or projector equipment. Between the two halves of the drum 11, 12 are two straight glass rodlets 25, 26 of rectangular cross-sectional shape, which by the use of a reflective interposed layer 27 are cemented together. The two glass rods 25, 26, as may be seen from Fig. 1, terminate in the direction of the photo-electric cells 28, 29 in two cone-shaped pieces 30, 31 and these, in turn, terminate in two surfaces 32, 33 which may be convex (looking from the photocells) or plane. The light which is transmitted across the two sound tracks 23, 24 is totally reflected on the inner face of the glass surfaces bounded by air so that the two rods, insofar as this action is concerned, will reforward the light without incidental losses, in fact, only a slight loss of light is caused because of absorption in the rods. The reflecting intermediary layer 27 between the two rods prevents also passage of light from one rod to the other. Beyond the point where the conical glass parts 30, 31 begin, reflection occurs in the rod only on the reflecting intermediary layer 27, while no reflection occurs any more on the rod walls. Hence, looking in the surface of the plane in Fig. 1, the light rays emerge from the cone-shaped parts 31, 32 in such a way that they will strike the two photo-electric cells which are coordinated to the two sound tracks 14, 15, while light rays emerging from one glass rod will not partly impinge also upon the other photocell, and vice versa, though this would be the case if the two glass rods were not provided with the two wedge- or cone-shaped enlargements at their ends.

Fig. 2 shows another embodiment in which the two glass rods 25, 26 are placed a small distance $d$ apart in such a way that they will be separated by a small, but finite, layer of air. In this form of construction the reflective intermediary layer 27 in Fig. 1 is dispensable.

Fig. 3 shows another embodiment in which a simplification has been adopted in that the cone-shaped terminal pieces 30, 31 which have been described by reference to Fig. 1 are dispensed with. The rods 25, 26 are disposed in such a way that their axes diverge slightly in the direction of the photo-electric cells. The glass rods may terminate in planar surfaces towards the photocells. In this arrangement the light rays emerge from the two glass rods in the form of a pencil presenting comparatively large divergence. By virtue of the great distance separating the two glass rods, however, no illumination of the photocell 35 (which may be used instead of the two distinct cells shown in Figs. 1 and 2 where they could also be united into one cell) will be produced in the cathode coordinated to the respective other rod.

Fig. 4 shows a scheme in which, contradistinct to the arrangements in Figs. 1–3, the two glass rods are disposed upon different sides of the sound pick-up drum spindle 13. In this arrangement, according to desires, the two rods 25 and 26 along the surface a, b, c, as shown in Fig. 1 may be cemented together by the aid of an interposed reflecting layer, or else, as in Fig. 2, be spaced apart a certain finite distance.

I claim:

1. In an apparatus for reproducing a sound record whereon the positive and negative half-cycle tracks are spaced from one another, the combination of means for supporting said record, light sensitive means including a plurality of cathodes, and a plurality of transparent rods interposed between said record and said light sensitive means each arranged to transmit light between a different one of said tracks and said light sensitive means.

2. In an apparatus for reproducing a sound record whereon the positive and negative half-cycle tracks are spaced from one another, the combination of means for supporting said record, light sensitive means including a plurality of cathodes, and a plurality of transparent rods each conically-shaped at one of its ends interposed between said record and said light sensitive means each arranged to transmit light between a different one of said tracks and said light sensitive means.

3. In an apparatus for reproducing a sound record whereon the positive and negative half-cycle tracks are spaced from one another, the combination of means for supporting said record, light sensitive means including a plurality of cathodes, a plurality of transparent rods interposed between said record and said light sensitive means each arranged to transmit light between a different one of said tracks and said light sensitive means, and a layer of reflective material interposed between said rods.

4. In an apparatus for reproducing a sound record whereon the positive and negative half-cycle tracks are spaced from one another, the combination of means for supporting said record, light sensitive means including a plurality of cathodes, and a plurality of angularly displaced transparent rods interposed between said record and said light sensitive means each arranged to transmit light between a different one of said tracks and said light sensitive means.

KARL SCHWARZ.